United States Patent Office 3,466,283
Patented Sept. 9, 1969

3,466,283
METHOD FOR PREPARING 3,4,6-TRICHLORO-PYRIDAZINE
Donald E. Bublitz, Concord, Calif., assignor to The Dow Chemical Company, Midland, Mich., a corporation of Delaware
No Drawing. Filed May 17, 1968, Ser. No. 729,930
Int. Cl. C07d 51/04
U.S. Cl. 260—250        3 Claims

ABSTRACT OF THE DISCLOSURE 3,4,6-trichloropyridazine is prepared by the direct chlorination of 3,6-dichloropyridazine. The reaction is a highly efficient one and can be conducted without formation of tetrachloropyridazine in other than trace amounts.

BACKGROUND OF THE INVENTION 3,4,6-trichloropyridazine is disclosed as a crystalline solid (melting at 57°–59° C.) in U.S. Patent No. 2,846,433. The patent teaches that this compound can be prepared by reaction of chloromaleic anhydride with hydrazine, followed by reaction with phosphorus oxychloride. The patent also teaches that the compound is an excellent herbicide and pesticide, At a concentration of 10 p.p.m. in water it completely inhibits algae growth and spore germination of *A. oleracea*. It is highly effective against strawberry spider mites in aqueous compositions at concentrations of 1 percent by weight. In aqueous composition at concentrations of 0.5 percent by weight it is effective as a pre- and post-emergent herbicide for the control of the germinant seeds and seedlings of wheat.

The starting material 3,6-dichloropyridazine utilized in the present invention is prepared by a method described in U.S. Patent No. 2,671,086, dated Mar. 2, 1954, said method being one wherein cyclic maleic hydrazide is reacted with phosphorus oxychloride, the latter being present in excess. The reaction proceeds rapidly at 90° C. and the 3,6-dichloropyridazine is recovered as a fraction having a melting point of 66°–68° C. and boiling at 123°–127° C. at 8 mm. Hg.

SUMMARY OF THE INVENTION

It has been discovered that 3,6-dichloropyridazine can be efficiently converted to 3,4,6-trichloropyridazine by the direct chlorination of 3,6-dichloropyridazine at temperatures at which hydrogen chloride of reaction is evolved. The 3,6-dichloropyridazine reactant can be present in either the molten state, or dispersed in a liquid reaction medium such as an organic solvent. The reactants are found to combine in equimolar proportions, with substantially no tetrachloropyridazine being formed. The 3,4,6-trichloropyridazine which is formed during the reaction can readily be distilled from the reaction mixture, the distillation preferably being conducted under reduced pressure. The desired product is that which distills at about 79°–81° C. at 0.3 mm. Hg or at 96°–97.5° C. at 2.3 mm. Hg. Alternatively, the product can be separated from the reaction mixture by the practice of conventional recrystallization techniques using such solvents as ethanol or hexane, for example.

It is among the advantages of the present invention that when the chlorine is brought into contact with 3,6-dichloropyridazine at temperatures somewhat below 100° C., an exothermic reaction ensues which brings the temperature of the liquid to at least 100° C. However, external heat is usually applied to bring the reaction mixture to practical operating temperatures of about and preferably above 100° C. as soon as possible and to maintain the temperature at 100° C. to 250° C. Temperatures below this range are impractical due to the long period of time required to bring the reaction to even a low degree of completion. At the other extreme, temperatures for any appreciable period above 250° C. are to be avoided since they lead to undue product degradation and formation of tars and other by-products, including tetrachloropyridazine. A preferred temperature range for employment in the present invention is from 130° to 200° C., a range which permits of relatively rapid reaction and which at the same time is accompanied by relatively little formation of undesired by-products.

3,6-dichloropyridazine has a melting point of 66–68° C. and a boiling point which is high enough so that it can be heated under atmospheric pressures at temperatures up to about 250° C. without engendering excessive vaporization of the material. It thus affords a convenient reaction medium in which to introduce the gaseous chlorine reactant.

The reaction proceeds equally well when the chlorine is bubbled into a dispersion or solution of 3,6-dichloropyridazine in a solvent which is inert to the chloropyridazine compounds and preferably to chlorine, as well. Representative solvents which can be employed for this purpose include carbon tetrachloride, 2,4-dichloropentane, pentachloropyridine, tetrachloroethylene, hexachlorobutadiene and 1,2,3-trichloropropene. Certain of these solvents may react with chlorine to a greater or lesser extent under the conditions employed. In the case of carbon tetrachloride or any other solvent which may boil at a temperature below that at which the reaction is to be conducted, elevated pressures can be employed to maintain the reaction mixture in the desired liquid condition.

The pressures which can be employed in the present process are not critical, and good results can be obtained at elevated or reduced pressures, as well at at atmospheric pressures which are preferred.

The exact proportions of the reactants to be employed are not critical, some of the desired product being obtained when the reactants are employed in any proportions. However, in going to completion the reaction consumes the reactants in equimolar proportions.

The efficiency with which gaseous chlorine combines with the pyridazine reactant is a function of such factors as temperature, viscosity of the reaction mixture and the degree of its mixing, as well as the pressure and degree of dispersion under which the chlorine is introduced. In general, the use of higher temperatures and the practice of good dispersion methods insuring intimate contact between liquid and gaseous phases tends to speed up the reaction. A suitable method of practicing this invention is to bubble the chlorine gas upwardly through a stirred liquid reaction mixture, the chlorine being introduced through one or a plurality of orifices communicating with said mixture. The chlorine gas which does not react leaves the reaction mixture along with gaseous hydrogen chloride and may be separated therefrom for possible recycle by conventional means. In one such method the gaseous exit stream is passed through water which traps the hydrogen chloride while releasing the excess chlorine gas. The latter is then dried before being recycled. The stirred mixture is held within the contacting temperature range for a period of time as chlorine gas is passed therethrough, conveniently from about 2 to 8 hours. Good yields are obtained under preferred temperature conditions, assuming good mixing and the presence of adequate chlorine, with reaction times of 2 to 4 hours.

Any suitable reactor can be employed, and since the reaction is exothermic, strong heating may be required only at the initiation of the reaction. Thereafter, heat is usually applied only as required to maintain the reaction mixture at the desired temperature. Accordingly, the reactor should be provided with a heating coil or other heating means so as to bring the liquid reaction mixture up to operating temperatures as rapidly as possible. The inlets, outlets and interior surfaces of the reactor must be of materials such as are known to resist corrosion by chlorine and hydrogen chloride at the moderately high temperatures employed in this reaction. Thus, such surfaces may be lined with nickel, carbon, silica or glass. In practice it has been found that thermally resistant, high-silica glass such as Vycor brand is satisfactory for small reaction systems. In large scale apparatus it is convenient to employ a shell of nickel lined with fused silica or a suitable refractory material such as carbon.

In a preferred method for carrying out the process according to the present invention, chlorine gas is passed upwardly through molten 3,6-dichloropyridazine at temperatures of from 100° C. to 250° C. or more preferably at 130° C. to 200° C. A gaseous effluent stream made up essentially of chlorine and hydrogen chloride is taken overhead as the reaction proceeds and may be scrubbed according to conventional procedures to separate chlorine from the hydrogen chloride formed during the reaction. The former can be dried and recycled while the latter can be recovered as hydrochloric acid. When the reaction is judged to be complete as evidenced by gas liquid chromatography (G.L.C.) or other method of analysis, the liquid mixture can be fractionally distilled under ambient or reduced pressures to separate the desired 3,4,6-trichloropyridazine.

DESCRIPTION OF THE PREFERRED EMBODIMENTS

The following examples illustrate the invention but are not to be construed as limiting.

Example 1

Dry chlorine gas is bubbled through a stirred melt of 50 g. of 3,6-dichloropyridazine at 70° C. at a rate of from 80 to 155 ml. per minute, the reacting mixture being maintained under atmospheric pressure. An exothermic reaction ensues which raises the temperature of the melt to 130° C. Additional heat is then supplied to the system to raise the temperature thereof to 150° C. while maintaining the same chlorine flow, and this condition is maintained for 3 hours. At this time G.L.C. analysis discloses that the reaction is complete. The crude reaction mixture is then distilled under vacuum to provide 48.8 g. of the 3,4,6-trichloropyridazine boiling at 96–97:5° C. at 2.3 mm. Hg. The reaction is productive of only trace amounts of tetrachloropyridazine.

Example 2

Dry chlorine gas is bubbled at a rate of 20 to 30 ml. per minute through a dispersion of 10 g. of 2,6-dichloropyridazine in 100 ml. of perchloroethylene contained in a flask equipped with a condenser. The solution is heated to reflux (120° C.) during a 3 hour period of chlorine addition. At the end of this time, the crude reaction mixture is subjected to G.L.C. analysis which discloses that the non-solvent portion of the mixture contains approximately 30 percent of 3,4,6-trichloropyridazine along with unreacted 3,6-dichloropyridazine. The solvent portion of the mixture is found to contain a significant portion of hexachloroethane. After stripping off the solvent, the 3,4,6-trichloropyridazine is separated by fractional distillation as the fraction boiling at 96–97.5° C. at 2.3 mm. Hg.

I claim:
1. The method for the preparation of 3,4,6-trichloropyridazine which comprises passing chlorine gas through a liquid system containing 3,6-dichloropyridazine while maintaining the temperature of said system between 130° and 200° C.
2. The method as in claim 1 wherein the chlorine is contacted with a melt of 3,6-dichloropyridazine.
3. The method as in claim 1 wherein the chlorine is contacted with a solution of 3,6-dichloropyridazine.

References Cited

UNITED STATES PATENTS 3,291,802  12/1966  Collins _____ 260—250

NICHOLAS S. RIZZO, Primary Examiner